United States Patent [19]

Kuwabara et al.

[11] Patent Number: 5,007,682

[45] Date of Patent: Apr. 16, 1991

[54] VEHICULAR SEAT ASSEMBLY

[75] Inventors: Isao Kuwabara; Yoshio Watanabe; Susumu Yoshimura; Hidekazu Maruyama, all of Kanagawa, Japan

[73] Assignee: Ikeda Bussan Co., Ltd., Ayase, Japan

[21] Appl. No.: 334,444

[22] Filed: Apr. 7, 1989

[30] Foreign Application Priority Data

Sep. 22, 1988 [JP] Japan .............................. 63-124195[U]

[51] Int. Cl.$^5$ .............................................. B60N 1/00
[52] U.S. Cl. ..................................... 297/452; 297/219; 297/440
[58] Field of Search ............... 297/341, 355, 367, 440, 297/443, 444, 452, 219; 248/429, 430

[56] References Cited

U.S. PATENT DOCUMENTS 3,333,891  8/1967  Werner et al. ................... 297/367 X
4,186,966  2/1980  Harder, Jr. .......................... 297/452
4,770,463  9/1988  Nishino .............................. 297/367

FOREIGN PATENT DOCUMENTS 2148929  3/1973  France .............................. 297/232

Primary Examiner—Peter R. Brown
Attorney, Agent, or Firm—Foley & Lardner

[57] ABSTRACT

A vehicular seat assembly is disclosed which comprises two seat sliders each including a lower rail secured to a vehicular floor and an upper rail sidably disposed on the lower rail; a seat frame securely mounted on the upper rails of the seat sliders; a seat cushion mounted on the seat frame; a side decorative panel attached to one lateral side of the seat frame for concealing unsightly portions; and a projection integrally formed on the side decorative panel, the projection being seated on the upper rail of one of the seat sliders.

8 Claims, 3 Drawing Sheets

VEHICULAR SEAT ASSEMBLY

BACKGROUND OF THE INVENTION

1. Field of the Invention

The present invention relates in general to vehicular seat assemblies, and more particularly, to vehicular seat assemblies of a type which has a slidable seat portion equipped with side decorative panels or finishers.

2. Description of the Prior Art

In order to clarify the task of the present invention, one conventional vehicular seat assembly of the above-mentioned type will be described with reference to FIG. 4 of the accompanying drawings.

The vehicular seat assembly 1 comprises generally a pair of seat sliders 2 (only one is shown) arranged on a vehicle floor, a seat frame 3 mounted on the seat sliders 2, a seat cushion 4 mounted on the seat frame 3, a seatback 6 connected to a rear portion of the seat frame 3 through a reclining device 5, and two side decorative panels 7 (only one is shown) attached to both sides of the seat cushion 4. Each side portion of the seat frame 3 is formed with threaded bores 3a. Each seat slider 2 comprises a lower rail 2a secured to the vehicle floor and an upper rail 2b mounting thereon the seat frame 3 and slidably disposed on the lower rail 2a through bearings.

Each decorative panel 7 is constructed of a moulded plastic and comprises a flanged major part, a plurality of ribs 7b and apertured mounting studs 7a. The decorative panel 7 is fixed to one side portion of the seat frame 3 by means of bolts 8, so that decorative panel 7 moves forward or rearward together with the seat.

Each bolt 8 is passed through the apertured mounting stud 7a and mated with the corresponding threaded bore 3a of the seat frame 3. With this, each decorative panel 7 conceals one side portion of the seat cushion 4, one seat slider 2, one side portion of the seat frame 3 and reclining device 5.

However, due to its inherent construction, the above-mentioned vehicular seat assembly has the following drawbacks.

That is, when the seat cushion 4 is depressed due to a weighty person sitting thereon, a large external force is applied to the side decorative panels 7 and thus flexed downward to such a degree that lower portions of the panels 7 are brought into contact with the vehicle floor. This contacting however, tends to produce uncomfortable noise when the seat is moved forward or rearward for the position adjustment. Furthermore, when the deformation exceeds a permitted degree, panels 7 are broken.

SUMMARY OF THE INVENTION

It is therefore an object of the present invention to provide a vehicular seat assembly which is free of the above-mentioned drawbacks.

According to the present invention, there is provided an improved side decorative panel which has a deformation suppressing structure.

According to the present invention, there is provided a vehicular seat assembly which comprises two seat sliders each including a lower rail secured to a vehicular floor and an upper rail slidably disposed on the lower rail; a seat frame securely mounted on the upper rails of the seat sliders; a seat cushion mounted on the seat frame; a side decorative panel attached to one lateral side of the seat frame for concealing unsightly portions; and a projection integrally formed on the side decorative panel, the projection being seated on the upper rail of one of the seat sliders.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
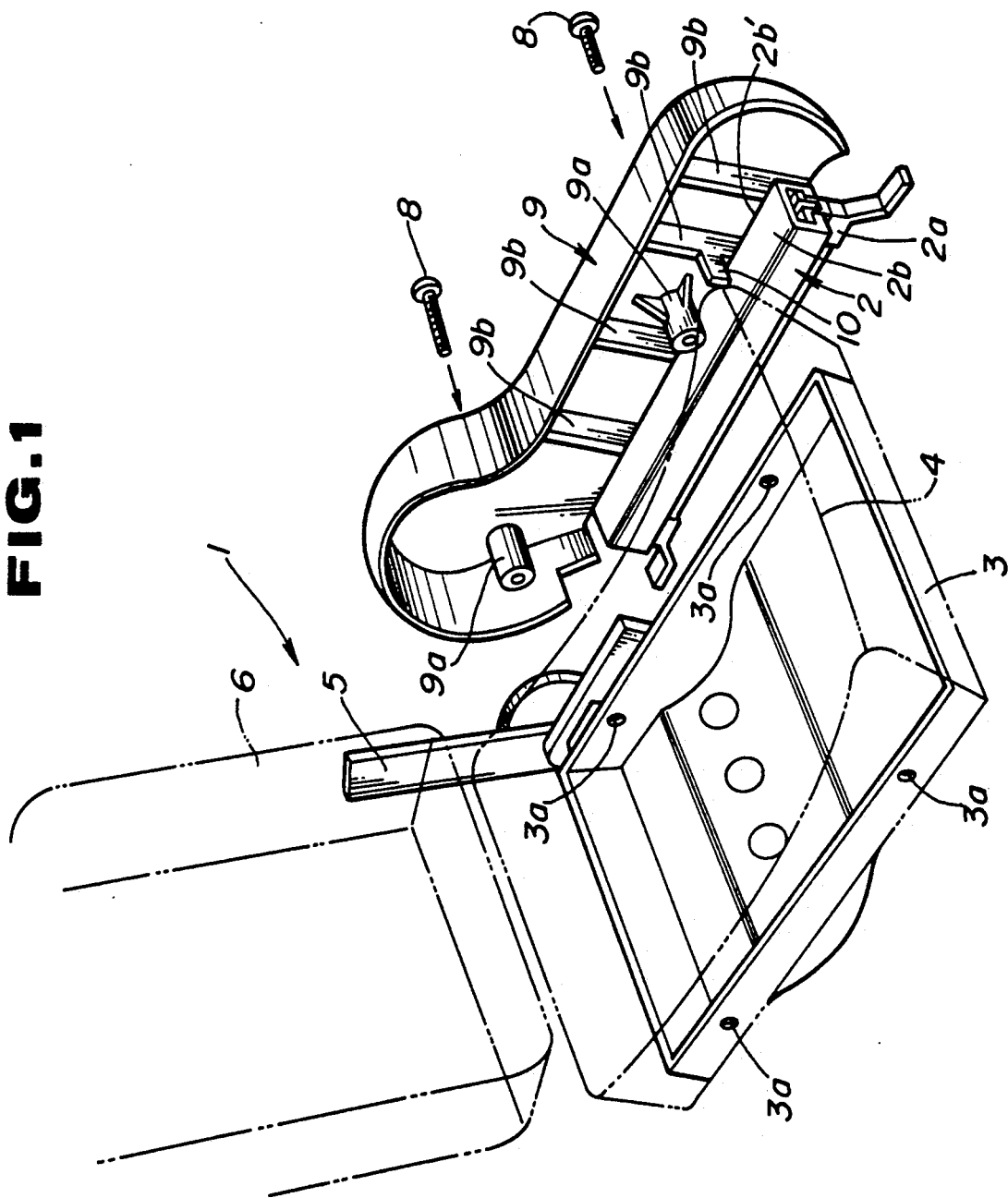
FIG. 1 is a schematic exploded view of a vehicular seat assembly of the present invention.
Figure 2:
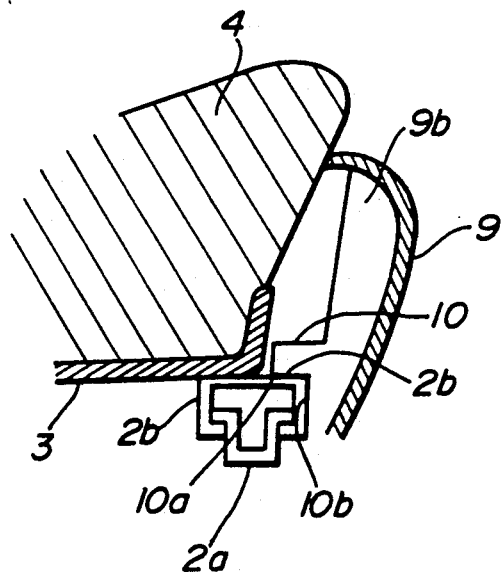
FIG. 2 is a sectional view of an essential part of the seat assembly of the invention.

Referring to FIGS. 1 and 2, particularly, FIG. 1, there is shown a vehicular seat assembly of a first embodiment of the present invention. Since parts of this embodiment are substantially the same as those of the above-mentioned conventional assembly except for the side decorative panels, the following description will be directed to only the panels. The same parts are denoted by the same numerals.

As seen from FIG. 1, the side decorative panel 9 employed in this embodiment is constructed of a moulded plastic and comprises a flanged major part, a plurality of ribs 9b on a surface of said major part and apertured mounting studs 9a on a surface of said major part.

One of the ribs 9b is integrally formed with a projection 10 by which, as will be seen from FIG. 2, an angled part consisting of a horizontal edge 10a and a vertical edge 10b is defined.

Upon requirement of mounting of the side decorative panel 9 to the seat, the angled part of the rib 9b is intimately mated with an outer shoulder portion 2b of the upper rail 2b of the seat slider 2, and the panel 9 is secured to the seat frame 3 by using bolts 8.

Thus, even when a certain load is applied to the side decorative panels 9 due to a weighty person sitting on the seat, the undesired downward flexure of each panels 9 is suppressed or at least minimized because of engagement between the projection 10 and the upper rail 2b of the seat slider 2.

Figure 3:
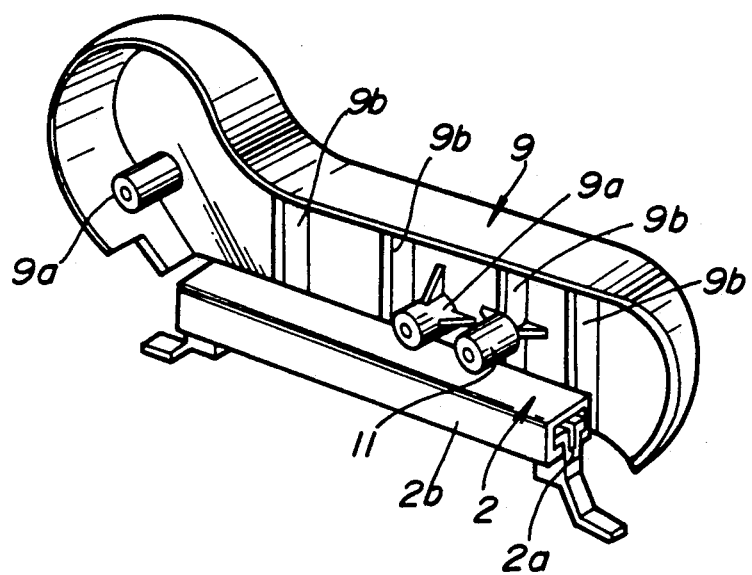
FIG. 3 is a perspective view of a modified side decorative panel usable in the invention.
Figure 4:
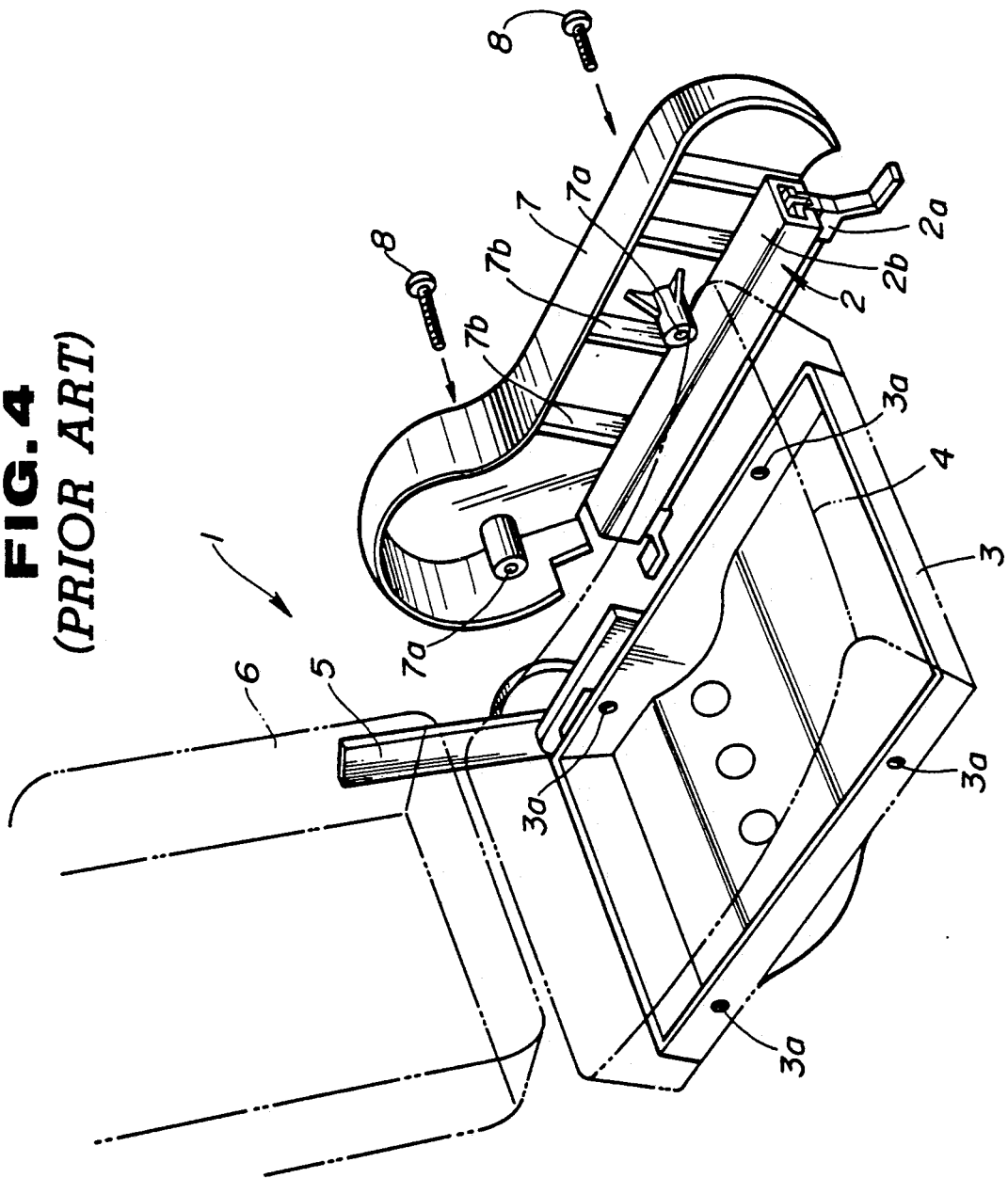
FIG. 4 is a view similar to FIG. 1, but showing a conventional vehicular seat assembly.

Referring to FIG. 3, there is shown a modification of the side decorative panel 9. In this modification, rib 9b has another apertured mounting stud 11 integrally formed thereon. Upon mounting, stud 11 is also bolted to seat frame 3 having its lower side seated on the upper rail 2b of the seat slider 2.

What is claimed is:

1. A vehicular seat assembly comprising:
   two seat sliders each including a lower rail secured to a vehicular floor and an upper rail slidably disposed on said lower rail;
   a seat frame securely mounted on the upper rails of the seat sliders;
   a seat cushion mounted on said seat frame;
   a side decorative panel extending along one lateral side of said seat frame for concealing unsightly portions;

at least two studs integrally formed on said side decorative panel, said studs being secured to the lateral side of said seat frame; and a projection integrally formed on said side decorative panel and having a free unattached end which is seated on the upper rail of one of said seat sliders.

2. A vehicular seat assembly as claimed in claim 1, in which said side decorative panel is constructed of a moulded plastic.

3. A vehicular seat assembly as claimed in claim 2, in which said side decorative panel comprises a flanged major part, a plurality of ribs on a surface of said major part and apertured mounting studs on a surface of said major part.

4. A vehicular seat assembly as claimed in claim 1, further comprising a seatback portion which is connected to said seat frame through a reclining device.

5. A vehicular seat assembly comprising:
two seat sliders each including a lower rail secured to a vehicular floor and an upper rail slidably disposed on said lower rail;
a seat frame securely mounted on the upper rails of the seat sliders;
a seat cushion mounted on said seat frame;
a side decorative panel attached to one lateral side of said seat frame for concealing unsightly portions;
said side decorative panel comprising a flanged major part, a plurality of ribs on a surface of said major part and apertured mounting studs on a surface of said major part, said side decorative panel being constructed of a molded plastic; and
a projection integrally formed on said side decorative panel, said projection being seated on said upper rail of one of said seat sliders, and one of said ribs is formed with said projection.

6. A vehicular seat assembly as claimed in claim 5, in which said decorative side panel is bolted to said seat frame with said apertured mounting studs seated on said seat frame.

7. A vehicular seat assembly as claimed in claim 6, in which bolts are passed through said apertured mounting studs and mated with apertured bores formed in said seat frame.

8. A vehicular seat assembly as claimed in claim 7, in which said projection is formed with a longitudinally extending bore through which a bolt is passed and mated with a threaded bore formed in said seat frame.

* * * * *